United States Patent
Mason, Jr. et al.

(10) Patent No.: US 8,661,063 B2
(45) Date of Patent: Feb. 25, 2014

(54) VERSIONED FILE SYSTEM WITH SHARING

(75) Inventors: Robert S. Mason, Jr., Uxbridge, MA (US); David M. Shaw, Newton, MA (US); Kevin W. Baughman, Natick, MA (US); Stephen Fridella, Watertown, MA (US)

(73) Assignee: Nasuni Corporation, Natick, MA (US)

( * ) Notice: Subject to any disclaimer, the term of this patent is extended or adjusted under 35 U.S.C. 154(b) by 62 days.

(21) Appl. No.: 13/271,460

(22) Filed: Oct. 12, 2011

(65) Prior Publication Data

US 2012/0089569 A1 Apr. 12, 2012

Related U.S. Application Data

(60) Provisional application No. 61/392,346, filed on Oct. 12, 2010.

(51) Int. Cl.
*G06F 17/30* (2006.01)

(52) U.S. Cl.
USPC .......................................................... 707/802

(58) Field of Classification Search
None
See application file for complete search history.

(56) References Cited

U.S. PATENT DOCUMENTS

| | | | |
|---|---|---|---|
| 5,787,480 A | 7/1998 | Scales et al. | |
| 5,819,292 A | 10/1998 | Hitz et al. | |
| 6,889,309 B1 | 5/2005 | Oliveira et al. | |
| 7,246,140 B2 | 7/2007 | Therrien et al. | |
| 7,246,275 B2 | 7/2007 | Thierrien et al. | |
| 7,587,431 B1 | 9/2009 | Rao et al. | |
| 7,593,966 B2 | 9/2009 | Thierrien et al. | |
| 7,752,492 B1 | 7/2010 | Armangau et al. | |
| 7,925,623 B2 | 4/2011 | Therrien et al. | |
| 8,306,948 B2 | 11/2012 | Chou et al. | |
| 8,341,363 B2 | 12/2012 | Chou et al. | |
| 8,356,016 B1 | 1/2013 | Chou et al. | |
| 2002/0046043 A1* | 4/2002 | Smith et al. | 705/1 |
| 2002/0062356 A1 | 5/2002 | Clarke et al. | |
| 2003/0154314 A1* | 8/2003 | Mason et al. | 709/250 |
| 2003/0158834 A1* | 8/2003 | Sawdon et al. | 707/1 |
| 2003/0229656 A1* | 12/2003 | Hitz et al. | 707/205 |
| 2004/0111422 A1* | 6/2004 | Devarakonda et al. | 707/100 |
| 2004/0153736 A1* | 8/2004 | Viswanathan et al. | 714/6 |
| 2004/0186858 A1 | 9/2004 | McGovern et al. | |
| 2004/0193703 A1* | 9/2004 | Loewy et al. | 709/220 |
| 2004/0205585 A1* | 10/2004 | McConnell | 715/513 |
| 2004/0254936 A1* | 12/2004 | Mohamed | 707/10 |
| 2005/0071379 A1 | 3/2005 | Kekre et al. | |
| 2005/0091448 A1 | 4/2005 | Nakatani et al. | |
| 2005/0114363 A1 | 5/2005 | Borthakur et al. | |
| 2006/0010174 A1 | 1/2006 | Nguyen et al. | |

(Continued)

*Primary Examiner* — Syed Hasan
(74) *Attorney, Agent, or Firm* — David H. Judson

(57) ABSTRACT

A method of data sharing among multiple entities is provided. Each entity exports to a data store a structured data representation comprising a versioned file system local to that entity. The method begins by forming a sharing group that includes two or more entities. Sharing of the structured data representations by members of the sharing group is enabled. The filers use a single distributed lock to protect each version of the file system. This lock is managed to allow each filer access to the shared file system volume to create its new version. To share a fully-versioned file system, asynchronous updates at each of the filers is permitted, and each node is then allowed to "push" its individual changes to the store to form the next version of the file system. A mechanism also may be used to reduce the period during which filers in the group operate under lock.

14 Claims, 8 Drawing Sheets

(56) References Cited

U.S. PATENT DOCUMENTS

| | | |
|---|---|---|
| 2006/0047813 A1* | 3/2006 | Aggarwal et al. ............. 709/226 |
| 2006/0075391 A1* | 4/2006 | Esmonde et al. ............. 717/136 |
| 2006/0080370 A1* | 4/2006 | Torii et al. ..................... 707/204 |
| 2006/0112116 A1* | 5/2006 | McConnell ................... 707/100 |
| 2006/0123016 A1* | 6/2006 | Ashok et al. .................. 707/100 |
| 2006/0224626 A1 | 10/2006 | Lakshminath et al. |
| 2007/0038697 A1* | 2/2007 | Zimran et al. ................ 709/203 |
| 2007/0185896 A1 | 8/2007 | Jagannath et al. |
| 2007/0208782 A1 | 9/2007 | Carter et al. |
| 2007/0260830 A1* | 11/2007 | Faibish et al. ................ 711/162 |
| 2008/0034327 A1 | 2/2008 | Cisler et al. |
| 2008/0172542 A1* | 7/2008 | Kaushik ....................... 711/202 |
| 2008/0222607 A1 | 9/2008 | Gan et al. |
| 2008/0244028 A1* | 10/2008 | Le et al. ....................... 709/208 |
| 2008/0307016 A1* | 12/2008 | Hornkvist et al. ........... 707/204 |
| 2009/0070536 A1* | 3/2009 | Nasre ........................... 711/162 |
| 2009/0083056 A1 | 3/2009 | Gole et al. |
| 2009/0144395 A1 | 6/2009 | Desalvo |
| 2009/0240737 A1 | 9/2009 | Hardisty et al. |
| 2010/0088277 A1 | 4/2010 | Rao et al. |
| 2010/0161759 A1 | 6/2010 | Brand |
| 2010/0191774 A1* | 7/2010 | Mason et al. ................. 707/797 |
| 2010/0191783 A1* | 7/2010 | Mason et al. ................. 707/822 |
| 2011/0276713 A1 | 11/2011 | Brand |
| 2012/0079368 A1* | 3/2012 | Abdelaziz et al. ........... 715/234 |
| 2012/0303586 A1* | 11/2012 | Drath et al. .................. 707/649 |
| 2013/0041931 A1 | 2/2013 | Brand |

* cited by examiner

VERSIONED FILE SYSTEM WITH SHARING

This application is based on Ser. No. 61/392,346, filed Oct. 12, 2010.

BACKGROUND OF THE INVENTION

1. Technical Field

This application relates generally to data storage.

2. Background of the Related Art

It is known to provide an interface between an existing local file system and a data store (e.g., a "write-once" store) to provide a "versioned" file system. The versioned file system comprises a set of structured data representations, such as XML. In a representative embodiment, at a first time, the interface creates and exports to a data store a first structured data representation corresponding to a first version of the local file system. The first structured data representation is an XML tree having a root element, a single directory (the "root directory") under the root element, zero or more directory elements associated with the root directory, and zero or more elements (such as files) associated with a given directory element. Each directory in turn can contain zero or more directories and zero or more files. Upon a change within the file system (e.g., file creation, file deletion, file modification, directory creation, directory deletion and directory modification), the interface creates and exports a second structured data representation corresponding to a second version of the file system. The second structured data representation differs from the first structured data representation up to and including the root element of the second structured data representation. Thus, the second structured data representation differs from the first structured data representation in one or more (but not necessarily all) parent elements with respect to the structured data element in which the change within the file system occurred. The interface continues to generate and export structured data representations to the data store, preferably at given "snapshot" times when changes within the file system have occurred. The data store comprises any type of back-end storage device, system or architecture. In one embodiment, the data store comprises one or more cloud storage service providers. As necessary, a given structured data representation is then used to retrieve an associated version of the file system. In this manner, the versioned file system only requires write-once behavior from the data store to preserve its complete state at any point-in-time.

BRIEF SUMMARY

According to this disclosure, a method of data sharing among multiple entities is provided. Each entity (a "node" or "filer") creates and exports to a data store (e.g., cloud-based storage) a structured data representation comprising a versioned file system local to that entity. The method begins by forming a sharing group that includes two or more of the multiple entities. Sharing of the structured data representations by members of the sharing group is then enabled. In one embodiment, the filers in a sharing group use a single distributed lock to protect each version of the file system. This lock is then managed to allow each filer access to the shared file system volume to create its new version. To share a fully-versioned file system between or among multiple nodes in this read-write fashion, asynchronous updates at each of the filers is permitted, and each node is then allowed to "push" its individual changes to the cloud to form the next version of the file system. Before pushing its changes to create the next version, each node in the sharing group merges the changes from all previous versions in the cloud that were created since the node's last push. As an optimization, a mechanism may be used to reduce the period during which filers in the sharing group operate under lock.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
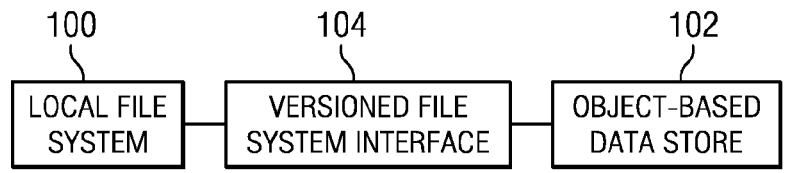
FIG. 1 is a block diagram illustrating how a known versioned file system interfaces a local file system to an object-based data store.

FIG. 1 illustrates a local file system 100 and an object-based data store 102. Although not meant to be limiting, preferably the object-based data store 102 is a "write-once" store and may comprise a "cloud" of one or more storage service providers. An interface 104 provides for a "versioned file system" that only requires write-once behavior from the object-based data store 102 to preserve substantially its "complete" state at any point-in-time. As used herein, the phrase "point-in-time" should be broadly construed, and it typically refers to periodic "snapshots" of the local file system (e.g., once every "n" minutes). The value of "n" and the time unit may be varied as desired. The interface 104 provides for a file system that has complete data integrity to the cloud without requiring global locks. In particular, this solution circumvents the problem of a lack of reliable atomic object replacement in cloud-based object repositories. The interface 104 is not limited for use with a particular type of back-end data store. When the interface is positioned in "front" of a data store, the interface has the effect of turning whatever is behind it into a "versioned file system" ("VFS"). The VFS is a construct that is distinct from the interface itself, and the VFS continues to exist irrespective of the state or status of the interface (from which it may have been generated). Moreover, the VFS is self-describing, and it can be accessed and managed separately from the back-end data store, or as a component of that data store. Thus, the VFS (comprising a set of structured data representations) is location-independent. In one embodiment, the VFS resides within a single storage service provider (SSP) although, as noted above, this is not a limitation. In another embodiment, a first portion of the VFS resides in a first SSP, while a second portion resides in a second SSP. Generalizing, any given VFS portion may reside in any given data store (regardless of type), and multiple VFS portions may reside across multiple data store(s). The VFS may reside in an "internal" storage cloud (i.e. a storage system internal to an enterprise), an external storage cloud, or some combination thereof.

The interface 104 may be implemented as a machine. A representative implementation is the Nasuni® Filer, available from Nasuni Corporation of Massachusetts. Thus, for example, typically the interface 104 is a rack-mounted server appliance comprising hardware and software. The hardware typically includes one or more processors that execute software in the form of program instructions that are otherwise stored in computer memory to comprise a "special purpose" machine for carrying out the functionality described herein. Alternatively, the interface is implemented as a virtual machine or appliance (e.g., via VMware®, or the like), as software executing in a server, or as software executing on the native hardware resources of the local file system. The interface 104 serves to transform the data representing the local file system (a physical construct) into another form, namely, a versioned file system comprising a series of structured data representations that are useful to reconstruct the local file system to any point-in-time. A representative VFS is the Nasuni Unity File System (UniFS™). Although not meant to be limiting, preferably each structured data representation is an XML document (or document fragment). As is well-known, extensible markup language (XML) facilitates the exchange of information in a tree structure. An XML document typically contains a single root element (or a root element that points to one or more other root elements). Each element has a name, a set of attributes, and a value consisting of character data, and a set of child elements. The interpretation of the information conveyed in an element is derived by evaluating its name, attributes, value and position in the document.

The interface 104 generates and exports to the write-once data store a series of structured data representations (e.g., XML documents) that together comprise the versioned file system. The data representations are stored in the data store. Preferably, the XML representations are encrypted before export to the data store. The transport may be performed using known techniques. In particular, REST (Representational State Transfer) is a lightweight XML-based protocol commonly used for exchanging structured data and type information on the Web. Another such protocol is Simple Object Access Protocol (SOAP). Using REST, SOAP, or some combination thereof, XML-based messages are exchanged over a computer network, normally using HTTP (Hypertext Transfer Protocol) or the like. Transport layer security mechanisms, such as HTTP over TLS (Transport Layer Security), may be used to secure messages between two adjacent nodes. An XML document and/or a given element or object therein is addressable via a Uniform Resource Identifier (URI). Familiarity with these technologies and standards is presumed.

Figure 2:
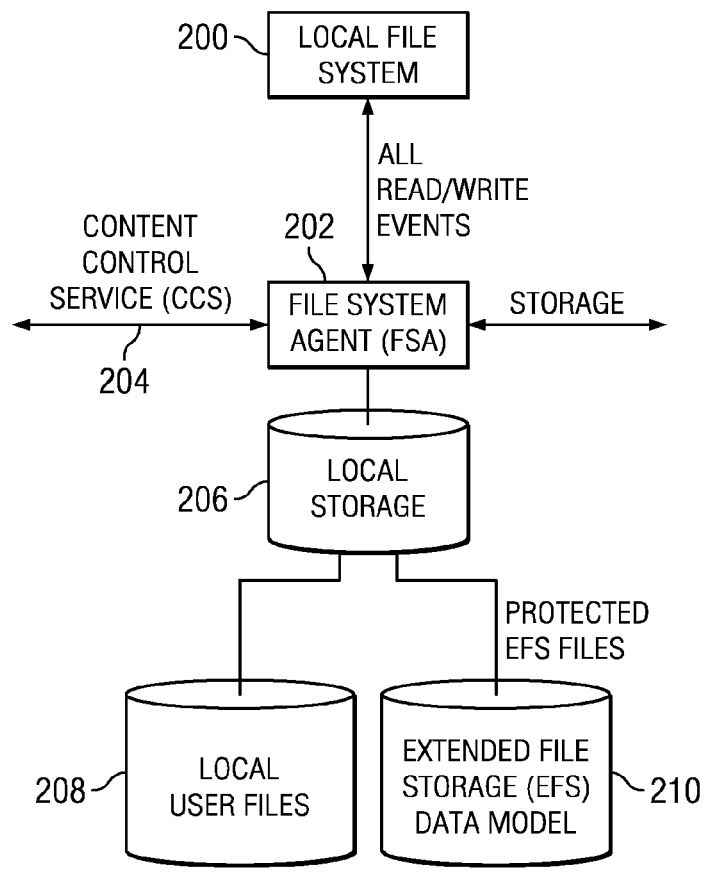
FIG. 2 is a block diagram of a representative implementation of a portion of the interface shown in FIG. 1.

FIG. 2 is a block diagram of a representative implementation of how the interface captures all (or given) read/write events from a local file system 200. In this example implementation, the interface comprises a file system agent 202 that is positioned within a data path between a local file system 200 and its local storage 206. The file system agent 202 has the capability of "seeing" all (or some configurable set of) read/write events output from the local file system. The interface also comprises a content control service (CCS) 204 as will be described in more detail below. The content control service is used to control the behavior of the file system agent. The object-based data store is represented by the arrows directed to "storage" which, as noted above, typically comprises any back-end data store including, without limitation, one or more storage service providers. The local file system stores local user files (the data) in their native form in cache 208. Reference numeral 210 represents that portion of the cache that stores pieces of metadata (the structured data representations, as will be described) that are exported to the back-end data store (e.g., the cloud).

Figure 3:
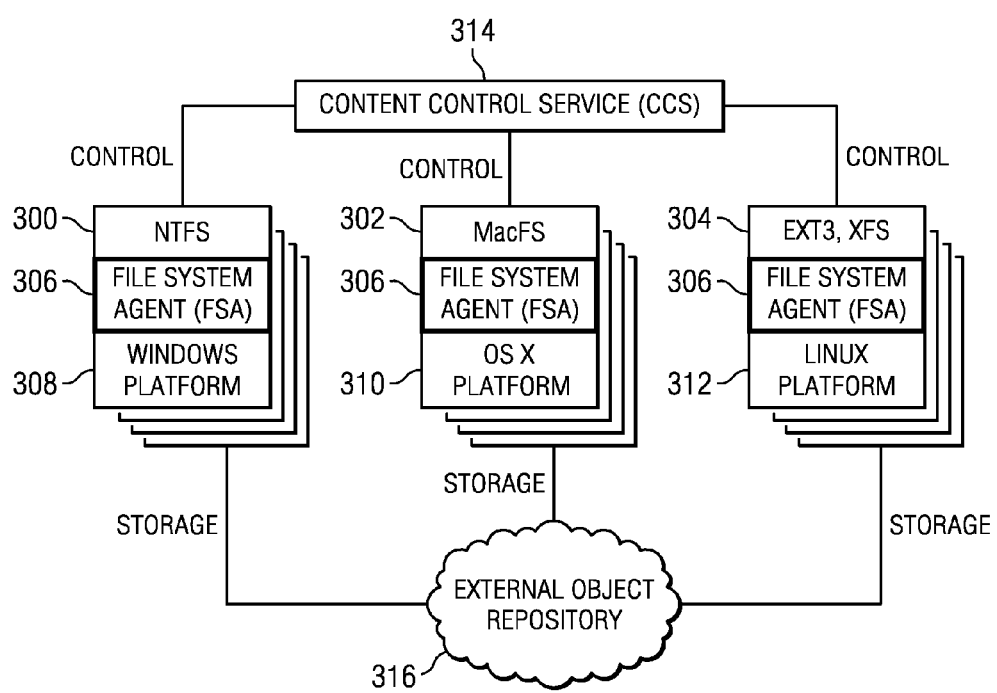
FIG. 3 is a more detailed implementation of the interface where there are a number of local file systems of different types.

FIG. 3 is a block diagram illustrating how the interface may be used with different types of local file system architectures. In particular, FIG. 3 shows the CCS (in this drawing a Web-based portal) controlling three (3) FSA instances. Once again, these examples are merely representative and they should not be taken to limit the invention. In this example, the file system agent 306 is used with three (3) different local file systems: NTFS 300 executing on a Windows operating system platform 308, MacFS (also referred to as "HFS+" (HFSPlus)) 302 executing on an OS X operating system platform 310, and EXT3 or XFS 304 executing on a Linux operating system platform 312. These local file systems may be exported (e.g., via CIFS, AFP, NFS or the like) to create a NAS system based on VFS. Conventional hardware, or a virtual machine approach, may be used in these implementations, although this is not a limitation. As indicated in FIG. 3, each platform may be controlled from a single CCS instance 314, and one or more external storage service providers may be used as an external object repository 316. As noted above, there is no requirement that multiple SSPs be used, or that the data store be provided using an SSP.

Figure 4:
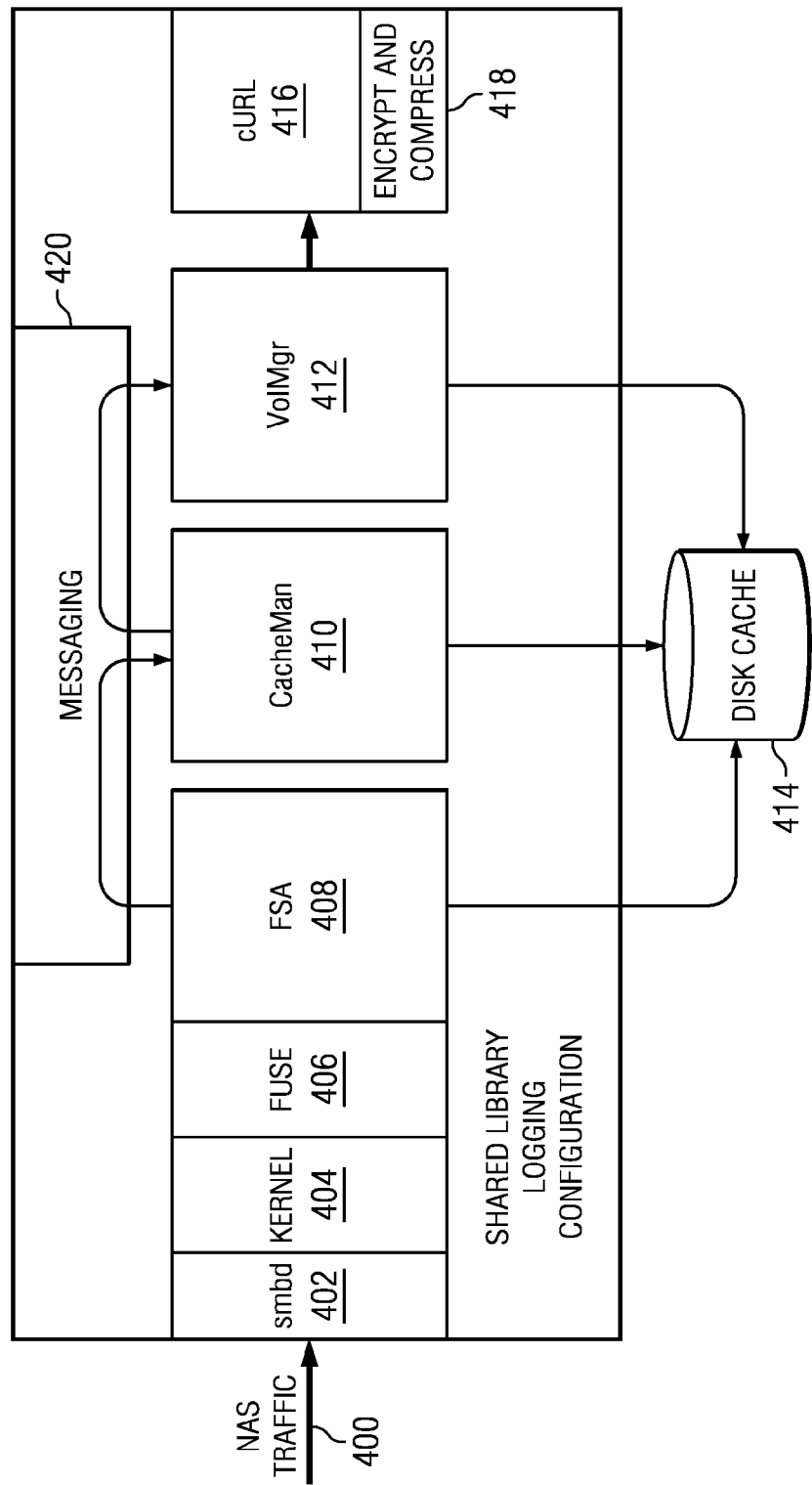
FIG. 4 illustrates the interface implemented as an appliance within a local processing environment.

FIG. 4 illustrates the interface implemented as an appliance within a local processing environment. In this embodiment, the local file system traffic 400 is received over Ethernet and represented by the arrow identified as "NAS traffic." That traffic is provided to smbd layer 402, which is a SAMBA file server daemon that provides CIFS (Windows-based) file sharing services to clients. The layer 402 is managed by the operating system kernel 404 is the usual manner. In this embodiment, the local file system is represented (in this example) by the FUSE kernel module 406 (which is part of the Linux kernel distribution). Components 400, 402 and 404 are not required to be part of the appliance. The file transfer agent 408 of the interface is associated with the FUSE module 406 as shown to intercept the read/write events as described above. The CCS (as described above) is implemented by a pair of modules (which may be a single module), namely, a cache manager 410, and a volume manager 412. Although not shown in detail, preferably there is one file transfer agent instance 408 for each volume of the local file system. The cache manager 410 is responsible for management of "chunks" with respect to a local disk cache 414. This enables the interface described herein to maintain a local cache of the data structures (the structured data representations) that comprise the versioned file system. The volume manager 412 maps the root of the FSA data to the cloud (as will be described below), and it further understands the one or more policies of the cloud storage service providers. The volume manager also provides the application programming interface (API) to these one or more providers and communicates the structured data representations (that comprise the versioned file system) through a transport mechanism 416 such as cURL. cURL is a library and command line tool for transferring files with URL syntax that supports various protocols such as FTP, FTPS, HTTP, HTTPS, SCP, SFTP, TFTP, TELNET, DICT, LDAP, LDAPS and FILE. cURL also supports SSL certificates, HTTP POST, HTTP PUT, FTP uploading, HTTP form based upload, proxies, cookies, user+password authentication, file transfer resume, proxy tunneling, and the like. The structured data representations preferably are encrypted and compressed prior to transport by the transformation module 418. The module 418 may provide one or more other data transformation services, such as duplicate elimination. The encryption, compression, duplicate elimination and the like, or any one of such functions, are optional. A messaging layer 420 (e.g., local socket-based IPC) may be used to pass messages between the file system agent instances, the cache manager and the volume manager. Any other type of message transport may be used as well.

The interface shown in FIG. 4 may be implemented as a standalone system, or as a managed service. In the latter case, the system executes in an end user (local file system) environment. A managed service provider provides the system (and the versioned file system service), preferably on a fee or subscription basis, and the data store (the cloud) typically is provided by one or more third party service providers. The versioned file system may have its own associated object-based data store, but this is not a requirement, as its main operation is to generate and manage the structured data representations that comprise the versioned file system. The cloud preferably is used just to store the structured data representations, preferably in a write-once manner, although the "versioned file system" as described herein may be used with any back-end data store.

As described above, the file system agent 408 is capable of completely recovering from the cloud (or other store) the state of the native file system and providing immediate file system access (once FSA metadata is recovered). The FSA can also recover to any point-in-time for the whole file system, a directory and all its contents, a single file, or a piece of a file. These and other advantages are provided by the "versioned file system" of this disclosure, as it now described in more detail below.

Figure 5:
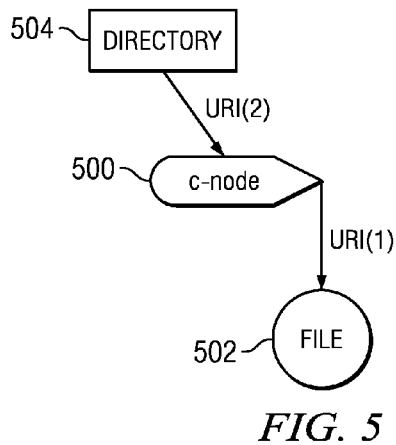
FIG. 5 illustrates a portion of a file system "tree" showing the basic component elements that are used to create a structured data representation of the "versioned" file system according to the teachings herein.

FIG. 5 is a representation of a portion of a tree showing the basic elements that are represented in a versioned file system according to one embodiment. The reference numeral 500 is a c-node (or "cloud" node). A c-node preferably contains all of the information passed by a file system agent instance about an inode (or inode-equivalent) local file system. As will be seen in the examples below, the inode subset of the c-node includes data that would be returned by a typical "stat" function call, plus any additional extended attributes that are file system-dependent. One or more remaining parts of the c-node are used to provide a CCS super-user with additional access control and portability across specific file system instances. Stated another way, c-nodes preferably act as super-nodes for access control to files and metadata. While the inode substructure contains information from the original local file system, c-nodes allow administrators of the system to gain access to files in a portable, file system-independent manner. Preferably, each c-node is addressable by a URI. A c-node preferably also includes a pointer to the actual location of the data file. C-nodes indicate where the remote copies of the item may be found in the data store. The reference numeral 502 is a data file. This object represents the file preferably as it was created in the local file system. One of the main benefits to isolating the metadata in the c-nodes is that a user's data files can be stored with no modifications. As in a traditional file system, preferably the name of the file is stored in the directory or directories that contain it and not as a part of the file itself. Preferably, URIs (for the actual data files in the cloud) remain opaque to the end-users, although this is not a requirement. An FSA instance controls access to the data file URIs through the respective c-nodes. The reference numeral 504 is a directory. Directories are c-nodes that contain a simple list relating names to the corresponding URIs for other c-nodes that, in turn, point to other files or directories. Directories provide a convenient way to establish a namespace for any data set. There can be multiple directories that point to the same files or directories. The above-described approach can support hard links or symbolic links. Hard links are simply multiple name entries that point to the same c-node. A symbolic link is a name entry that contains another name inside; when resolving the link, the entry is read and the resolution process is then restarted using the inner name. Directories are owned by their own c-node, which preferably holds its metadata and controls access to it.

Figure 6:
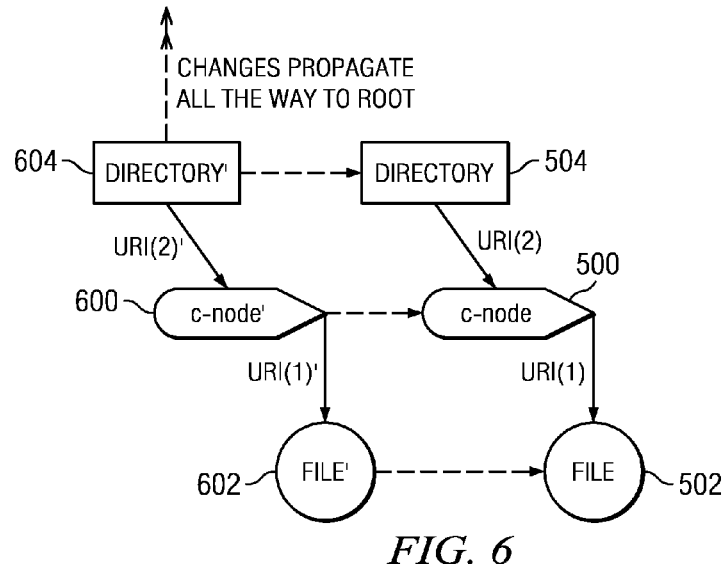
FIG. 6 illustrates the portion of the tree (as shown in FIG. 5) after a change to the contents of the file has occurred in the local file system.

FIG. 6 illustrates the portion of the tree (as shown in FIG. 5) after a change to the contents of the file 502 has occurred in the local file system. In this example, which is merely representative, a new version of the local file system is then created (preferably at a "snapshot" period, which is configurable). The new version comprises the file 602, the new c-node 600, and the new directory 604. As also seen in this drawing, the changes to the tree also propagate to the root. In particular, upon a given occurrence in the local file system (as will be described), a "new version" of the file system is created (for export to the cloud), and this new version is represented as a new structured data representation (e.g., a new XML document). As will be seen, the new structured data representation differs from the prior version in one or more parent elements with respect to the structured data element in which the change within the file system occurred. Thus, upon a change within the file system, the interface creates and exports to the data store a second structured data representation corresponding to a second version of the file system, and the second structured data representation differs from the first structured data representation up to and including the root element of the second structured data representation. In this manner, the interface provides for a "versioned" file system that has complete data integrity to the data store without requiring global locks.

The second structured data representation may "borrow" unchanged parts of the first structured data representation. Thus, the second structured data representation does not need to construct or even consider parts of the tree that were not changed; it just points to the same c-nodes that the first structured data representation does.

Figure 7:
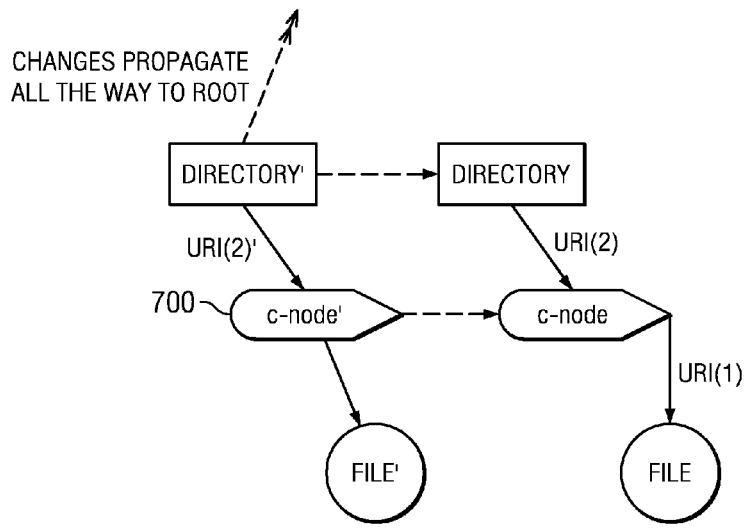
FIG. 7 illustrates the portion of the tree (as shown in FIG. 5) after a change to the contents of the c-node has occurred.
Figure 8:
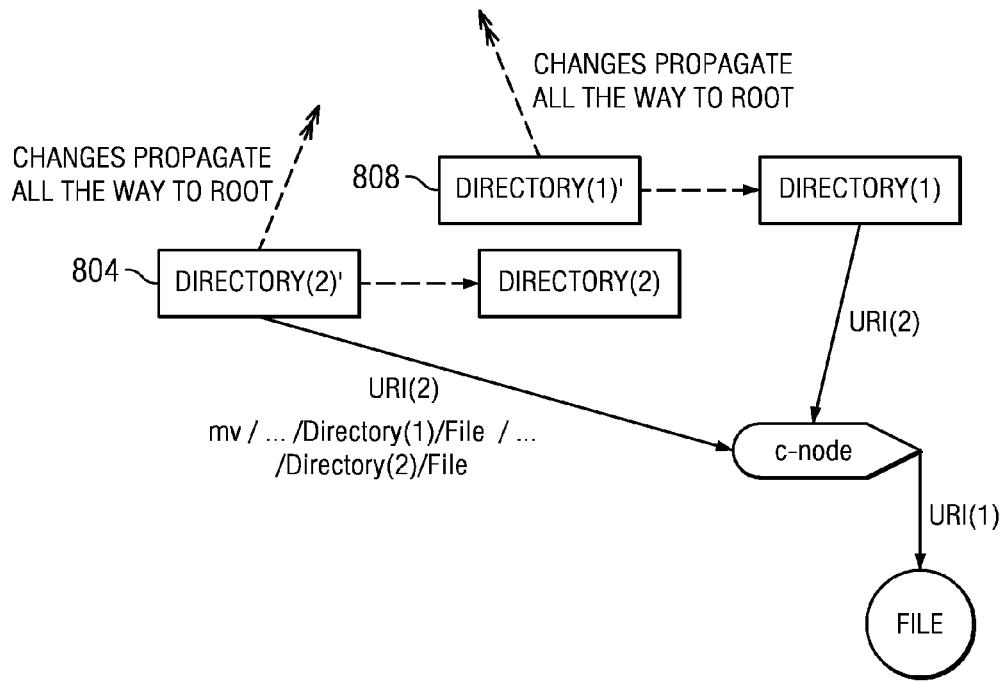
FIG. 8 illustrates the portion of the tree (as shown in FIG. 5) after a change to the contents of a directory has occurred.

FIG. 6 illustrates one type of change (a file update) that triggers the generation of a new version. FIG. 7 illustrates another type of change (an update to c-node 700) that also triggers the generation of a new version with changes propagated to root, and FIG. 8 illustrates yet another type of change (an update to each of the directories 804 and 808) that also implements a new version, once again with changes propagated to root. Generalizing, while the types of changes that trigger a new version may be quite varied, typically they include one of the following: file creation, file deletion, file modification, directory creation, directory deletion and directory modification. This list is representative.

Figure 9:
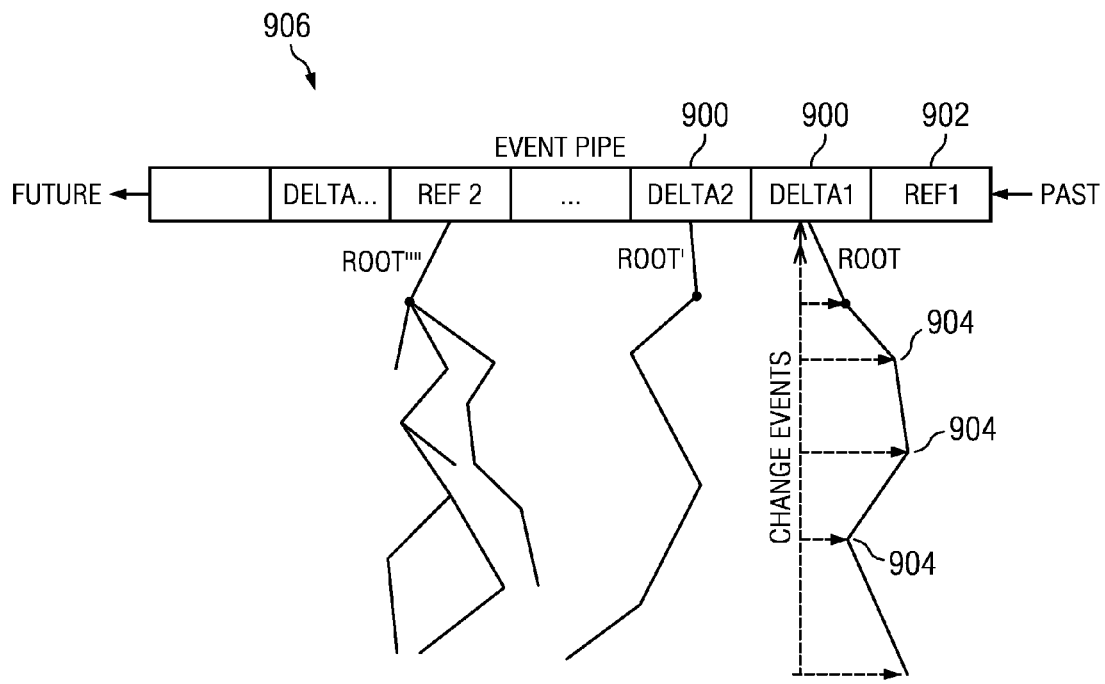
FIG. 9 illustrates how a number of file changes are aggregated during a snapshot period and then exported to the cloud as a new version.

Moreover, as noted, it is possible but not required that a new version be created at the time of the actual change in the local file system; typically, the new version is created after a "snapshot" of the local file system is taken, and a number of change events may occur during a given snapshot period. FIG. 9 illustrates this approach. As seen in this drawing, an FSA instance preferably aggregates all of the changes to the local file system in two ways: delta frames 900, and reference frames 902. The delta frames 900 control the number (and size) of the objects that need to be stored in cloud storage. As noted above, preferably every local file system event is recorded by the FSA instance as a change event 904. As noted, new inodes, directories and files trigger corresponding new entities (created by FSA) in the cloud; however, preferably modifications to existing structures create change events that are aggregated by FSA into a single new entity, the delta frame 900. A delta frame 900 starts with a new root that represents the current state of the file system. Preferably, the FSA instance compiles the delta frame information such that each of the new entry points (i.e. any modifications to the previous version) to c-nodes, directories and files are represented as new versions of the data structures plus pointers to the old structures. To reconstruct the current state of a local file system, an FSA client only has to walk a tree for any version to see all the correct items in the tree. Reference frames 902 are also compiled by FSA and contain an aggregation of the previous reference frame plus all the intervening delta frames.

A given reference frame 902 may be thought of as an entire copy with no references to previous versions, while a delta frame 900 may be thought of as including pointers to older versions. In other words, a delta frame logically is a combination of a current version and one or more prior versions. Each frame (reference or delta) may be considered a complete file system from a tree-walk perspective. This means that a walk of the tree, by itself, is all that is required to restore the file system (or any portion thereof, including a single file) to its associated state or point-in-time (as represented by the tree).

Preferably, by pointing to the same c-node that a previous version did, each version is complete in and of itself. There is no need to regenerate a "full" copy of a given version, as preferably each version is always full.

When it is desired to reconstruct the file system to a point in time (or, more generally, a given state), i.e., to perform a "restore," it is only required to walk (use) a single structured data representation (a tree). In other words, one and only one VFS tree may be used to identify a prior state of the local file system. It is not required to jump across multiple trees for this purpose.

Figure 10:
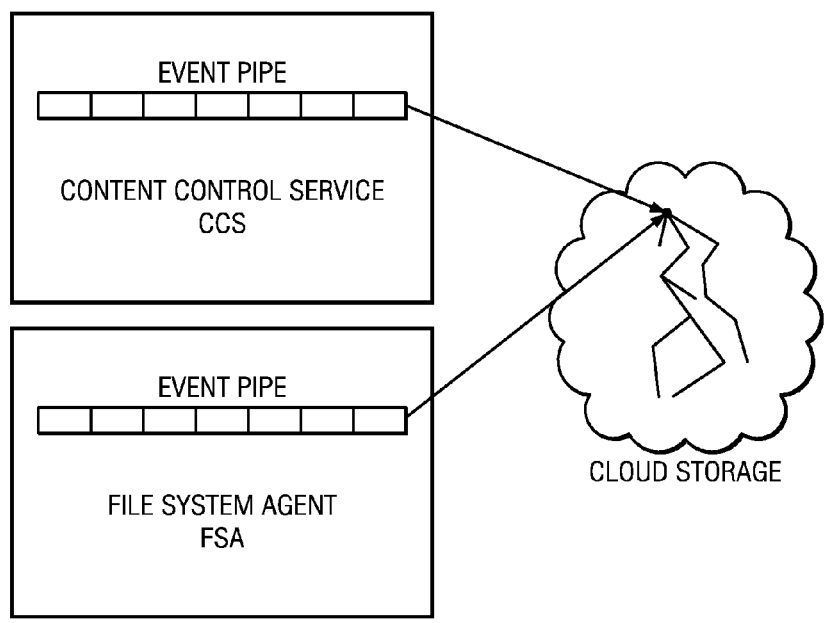
FIG. 10 illustrates how CCS maintains an event pipe.

Frames preferably are stored in an event pipe 906. As will be seen, the event pipe is implemented in a structured data representation as a table of contents (TOC), although this is not a limitation. Preferably, this data structure is held both at the FSA instance and at CCS, as illustrated in FIG. 10. The event pipe (with its entry points into cloud storage) is then the primary means to access all files stored remotely. In particular, one of ordinary skill in the art will appreciate that this is a lightweight data structure that preferably contains only versions of root for the given volume. Although it is desired that CCS be highly available, preferably the "writes" occur periodically in a transaction safe way as controlled by FSAs. The "reads" are only necessary when an FSA copy has failed; therefore, CCS can be run using an ordinary (high-availability) database or file-based back-end. Preferably, the mix of delta and reference frames in the event pipe is chosen to balance storage and bandwidth utilization against a practical recovery time for FSA to create a new local file system instance. The composition of the event pipe can also be set according to a configurable policy. For instance, users may choose to keep only so many versions or versions dating back to a specific date.

Figure 11:
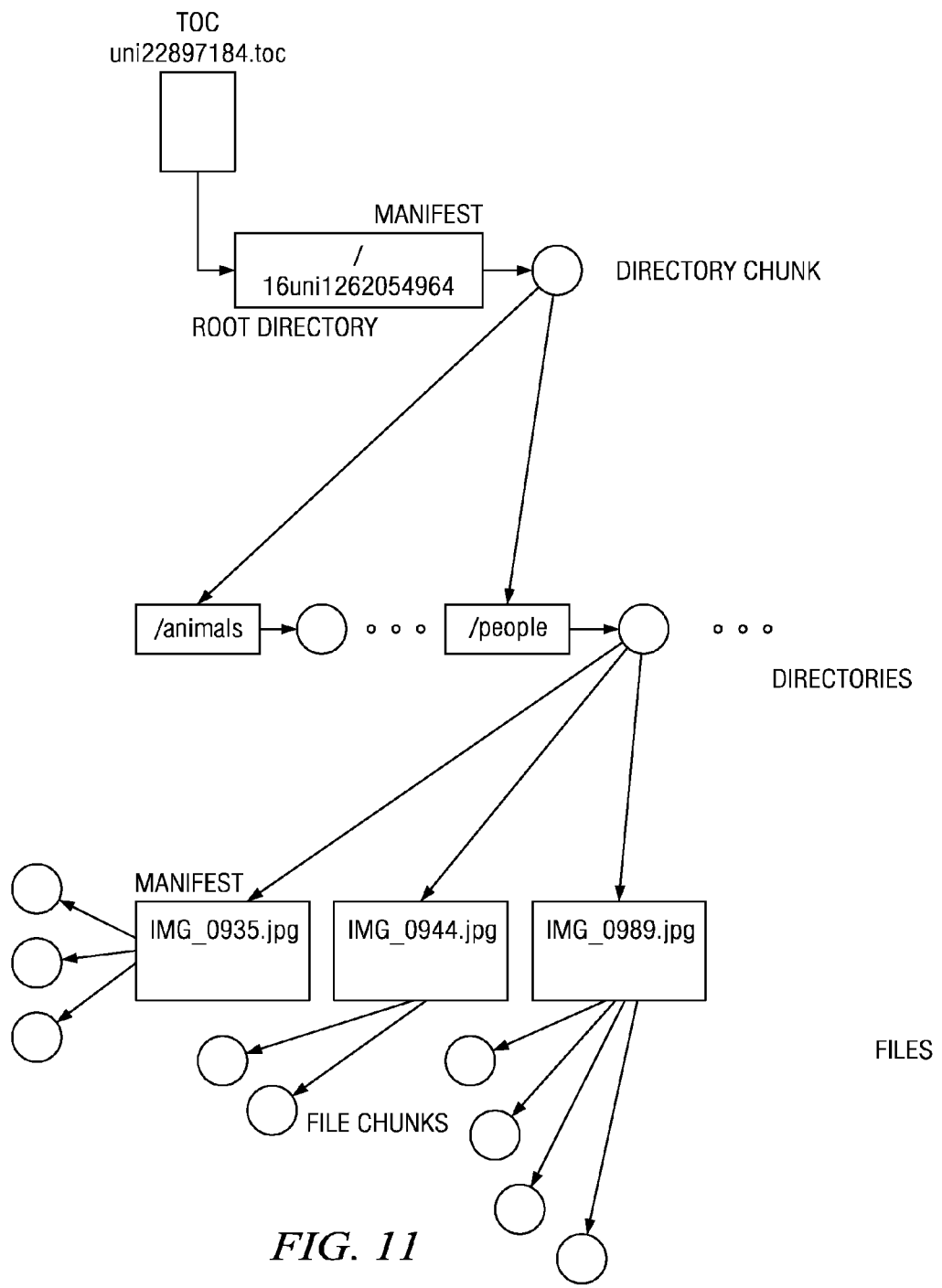
FIG. 11 illustrates a simple directory tree pushed to the cloud.
Figure 12:
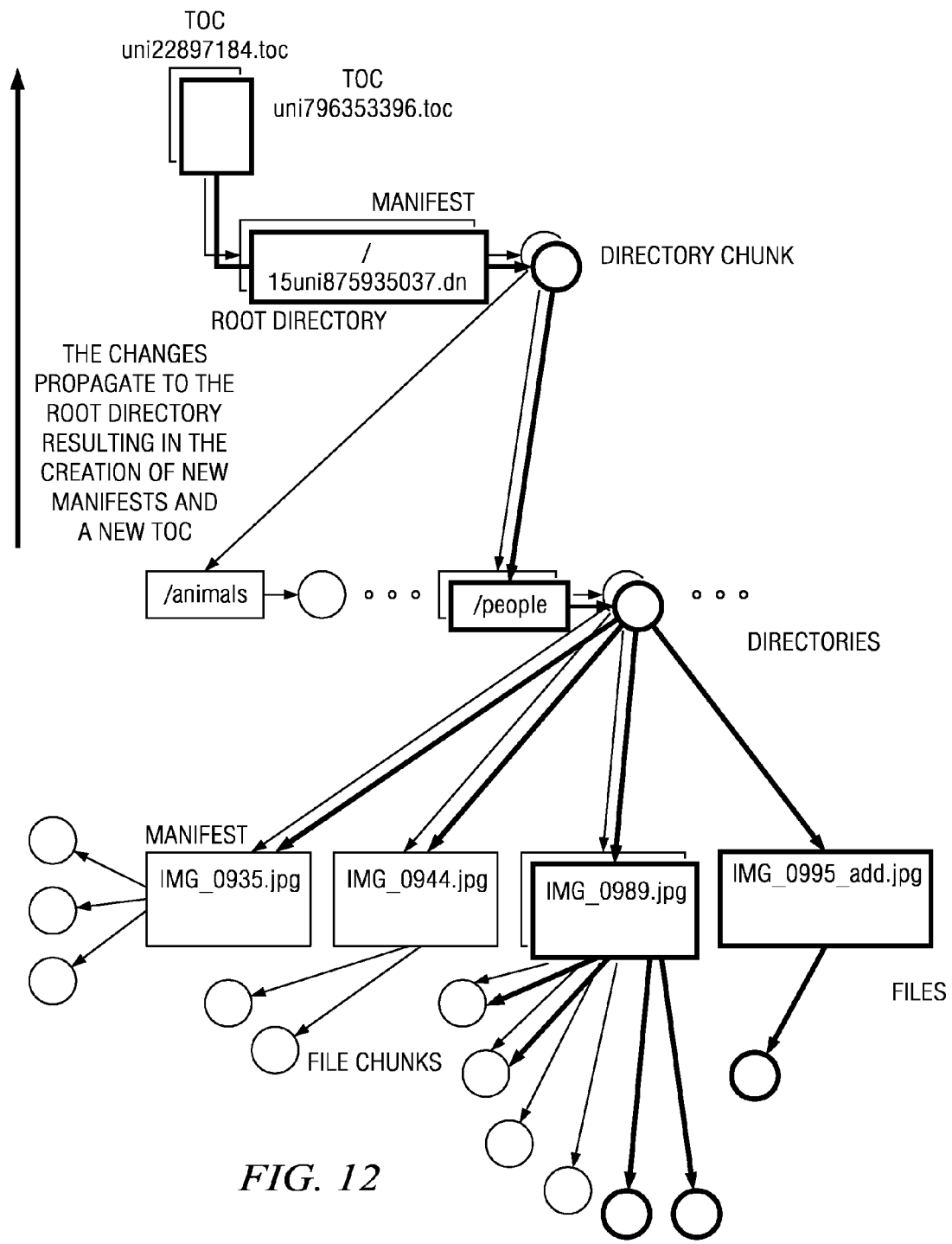
FIG. 12 illustrates the new version of that tree following several changes in the local file system.

FIG. 11 illustrates a directory tree in the cloud, and FIG. 12 illustrates the new version of that tree following several changes in the local file system. FIG. 11 is a simplified diagram. Because the data store is write-once, preferably a directory tree is pushed in two phases: phase 1 is all files (in any order), and phase 2 is all directories (in strict depth-first order). This allows a directory (in which the file or another directory is rooted) to be always written after the child file or directory is written. Other approaches may be used.

In a versioned cloud file system according to embodiment described in Ser. No. 12/483,030, filed Jul. 11, 2009, the disclosure of which is incorporated herein by reference, a versioned file system (VFS) comprises a set of structured data representations such as XML documents and document fragments. Names are object references that typically are not parsed by the system. The handle names typically have no relation to the actual file names or content. The handle names in the XML preferably are prefixed with a length component. Also, for items other than the table of contents (TOC), the path and version elements in the XML are informative and need not be used by the system. The "path" typically represents the originating path (in the local file system) when the item was last updated. The "version" typically represents the version of root at the time the item was last updated. The table of contents (TOC) is a table at the head of every version; preferably, the TOC contains references to all versions.

In the versioned cloud file system, each file is represented by a manifest object, and a series of chunk objects. The manifest object comprises a listing of the chunk objects that make up the file and each entry in the manifest preferably comprises a handle, an offset, and chunk length. The entry also preferably identifies a number of the version in which the chunk was created. A directory in the versioned cloud file system is represented in a similar manner (as is a file), with the contents of the directory being a series of directory entries. A directory entry also comprises a name, as well as other attributes for the file/directory, as well as the handle for the manifest that represents the contents of the file/directory. As described, a version is defined as the tree of objects rooted at a particular root directory manifest. A file-system table of contents (TOC) contains the handle of a latest root directory manifest, as well as a list of all previously root directory manifests. For each table of contents entry, there is also preferably stored a timestamp, version number, and a borrow window (as noted above, preferably an unsigned integer). In the versioned cloud file system, each of the objects is a write-once object, and versions often share objects (file/directory manifests, file/directory chunks).

Pruning a version means an operation starting from the root directory manifest for the version and deleting all objects in the tree that are not referenced in another version. A difficulty in pruning is dealing with the situation where items from that version have been "borrowed" by other versions. Thus, for example, assume that a first version V1 is created upon a write of file A and a write of file B. Now, assume that a second version V2 is created upon a write file C and a delete of file B. If it is then desired to prune V1, it is not possible to do so by merely deleting all the objects that V1 references because File A is still being used (i.e., borrowed) by version V2. As noted above, such "sharing" of objects is a characteristic of the versioned file system. As a consequence, any pruning algorithm must take into consideration two (2) types of objects: (i) objects in the pruned version that have been referenced from previous versions and thus should not be purged (sometimes referred to as "borrowed" objects); and (ii) objects created in the pruned version that are referenced (restored) in later versions (sometimes referred to as "lent" objects). During pruning, any objects that are borrowed or lent are not purged.

During pruning, preferably the search for "lent" objects is constrained by the borrow window of the version to be pruned, and preferably the search for "borrowed" objects is constrained by the size of the borrow window of the version in which the borrowed object was created. Constraining the searches in this manner provides computational and storage efficiencies, as the approach obviates scanning all versions backwards and forwards and limits the searching just to the versions within the above-described windows.

A borrow window is associated to each of a set of versions in the versioned file system. A version is then pruned by deleting all objects in the tree associated with the version that, at the time of pruning: (i) are not being lent to any other version within the borrow window of the version being pruned, and (ii) are not referenced in any other version whose borrow window is sufficiently large enough such that an object in the version could have been restored from that other version. Another way of thinking about constraint (ii) with respect to a particular object in the tree associated with the version (being pruned) is that the object is deleted if it does not reside within the lending window of the version in which the object was created. If it is assumed that the borrow window of the version being pruned does not include the current version of the versioned file system, then the temporal limitation ("at the time of pruning") is not necessary, as all of the objects associated with the version being pruned either are borrowed or not (and this fact cannot change during the time the pruning is taking place). Thus, pruning of versions that are still available for borrowing into the current version is not recommended and, in one embodiment, it not permitted at all.

More generally, the prune algorithm deletes a version from the versioned filed system by deleting all objects in the tree associated with the version that are not referenced in any other version whose borrow window is sufficiently large such that an object in the version could be restored from that other version.

During a restore, preferably metadata is pulled back from the cloud first, so users can see the existence of needed files immediately. The remainder of the data is then pulled back from the cloud if/when the user goes to open the file. As a result, the entire file system (or any portion thereof, including a single file) can be restored to a previous time nearly instantaneously. The metadata appears first (and is stitched into the file system, where it remains available for immediate use), and then the cache gradually fills with the associated files as they are requested (and as they are streamed back from the cloud). From the user's perspective, however, it will appear as if the data is actually present (restored) once merely the metadata is returned.

A "fast" restore is said to be performed if an object being restored exists within a "borrow window" of the version from which the system is restoring. During a fast restore, the file (or, more generally, file system portion) being restored is associated into a new place in the file system, which results in two identifiers (e.g., filenames) within the file system pointing to the same (single) object. As noted above, the metadata for the file (or file system portion) being restored is pulled back from the cloud first, so users can see the existence of needed files immediately. The remainder of the data is then pulled back from the cloud if/when the user goes to open the file. This enables the file system portion to be restored to a previous time nearly instantaneously.

Typically, a restore is triggered by a user choosing to restore his/her/its data. In a representative embodiment, a user opens an interface (e.g., a web-based UI) and selects a file (data, time, snapshot, etc.) and selects a "restore" button. The system determines whether the restore will proceed on a "fast" basis based on a "borrow window." By way of brief background, each version in the versioned file system is identified as a particular version (typically by a version number) and has associated therewith a "borrow window," which preferably is an integer value. A most-recently created version is a "current" version. In the context of a fast restore operation, the borrow window of interest is the borrow window of the older version from which an object is being restored. As used herein, this construct is sometimes referred to as the "restore" borrow window. Each individual version has its own associated borrow window, and for a set of versions, each borrow window may be different. A "borrow window" is sometimes referred to as a "borrowing window" or "window."

If a user-initiated restore requires objects from a version outside the restore borrow window, the system performs a "slow restore" (with respect to versions outside the restore borrow window) to copy from an old version to the latest version as necessary. The word "slow" in the phrase "slow restore" does not necessarily have temporal implications; by definition, a "slow restore" is a state or status associated with a new file that just happens to have the same name and content as an older file. The metadata for a new file, like all new files, is available when the file is written.

Sharing

The above-described discussion associates an interface 104 with a particular versioned file system (VFS). An extension to this approach to enable "sharing" across multiple versioned file systems is now described. As used herein, "sharing" refers to the ability to provide full read/write access at any time to any file/folder/volume owned by a particular filer (i.e. interface 104), or across multiple such filers. According to this approach, independent volumes are enabled to share data in the cloud.

Consider the case of two (2) filers that desire to do full read/write sharing of a single volume, where each of the filers uses an interface and creates a VFS as has been described above. In particular, Filer A has Volume-RW, and Filer B has Volume'-RW. Users of Filer A read and write Volume-RW as a normal file system, and users of Filer B read and write Volume'-RW as a normal file system. This type of operation has been described above. Now, according to the "sharing" technique herein, filers first register into a sharing group. Preferably, a web-based interface (or the like) is provided for this purpose, although any other convenient sharing group registration mechanism may be used. The registration interface includes or is associated with appropriate authentication and/or authorization mechanisms to ensure privacy and security, and that entities desiring to "share" independent volumes can manage their sharing appropriately. (Filers may also de-register from a sharing group using the web-based interface). At a start of each snapshot, a filer that has registered for a sharing group is provided (e.g., by the service provider or otherwise) a "snapshot lock" that includes its version number. By definition, during this lock no other filers can snapshot. Once the version is acquired, the filer that acquires the lock does the following: (i) the filer first looks at delta lists (attached to TOCs, and as described in more detail below) from the last version this filer pushed to the current version, and then applies all changes to its current file system; (ii) the filer then begins pushing to the cloud; and (iii) completes the push. In the alternative, instead of using delta lists, the filer can compare file system metadata (directories, structures, and so forth). When using file system compare, portions of the directory tree may not need to be compared, e.g., if there are common elements between or among the sides being merged.

During the push (i.e. as all chunks and the file manifests, etc. are being pushed), optionally a notification is sent to all other members of the sharing group notifying them of new/changed files. In the embodiment where notification is used, the message typically includes only the cloud handle for the file manifest; all other information (e.g., the GUID of the filer that wrote the file, the path of the file in the namespace, etc.) can be learned from this manifest. Preferably, the sending filer only has to send once, and the notification message is replicated into a persistent message queue for each other filer in the sharing group. (Preferably, each filer in the sharing group has an associated message queue, although this is not a limitation).

Once notified, each other filer in the sharing group performs the following: if the version of the object is greater than its own version, the other filer inserts the new/changed file into its "now" current file system using the fast restore algorithm described above. If the version of the object is less than its own version, the other filer ignores the update.

The use of notifications is not required.

During the snapshot, the filer doing the snapshot gets bundles (associated with each TOC) from the cloud for each version between its last snapshot and the current snapshot and that contains metadata about the items changed during the snapshot. Such metadata (sometimes referred to as a delta list) may include: path names, access control lists (ACLs), and handles. A delta list may be attached to each TOC that indicates what changes since the last TOC. Preferably, the deltas (differences) between the versions are merged into the current snapshot sequentially. A new delta frame is created and tied into the new TOC in connection with completing the snapshot operation.

As an optimization, changes may be streamed to the cloud when snapshotting is not occurring to improve sharing response time.

With respect to repeat changes, preferably a special message is sent to all others in the sharing group to confirm that the original manifest is no longer referenced (i.e. essentially that all in the sharing group have processed the queue to the point of the new message).

Sharing Mechanism—Implementation

1. Reduced Lock Sharing

As described, a simple technique to share a consistent fully-versioned file system (and, in particular, a "volume" therein) between or among multiple nodes (i.e., the filers in a sharing group) is to use a single distributed lock (the snapshot lock, as described) to protect each version of the file system. Preferably, this lock is then managed with one or more fairness algorithms to allow each node (filer) access to the shared file system volume to create its new version. While this approach works well, because each filer can only do work when under the lock, the one or more other filers (that do not have the lock) are essentially idle until they receive it. Accordingly, the aggregate bandwidth utilized by those in the sharing group may not be optimized.

Thus, a variant of the described approach is to reduce the period during which nodes in the sharing group operate under lock. This is sometimes referred to as "reduced lock sharing." Under this variant, and because data does not have to be sent to the cloud under lock, the lock is moved (i.e., delayed) so that it is not initiated until the metadata update phase. This allows for increased aggregate bandwidth to the cloud from all the nodes and faster responsiveness of the nodes in that the lock only occurs when the work (of sending the data to the cloud) is done and it is time to update the file system.

2. Non-Preemptive Sharing Scheduling

While reduced lock sharing is advantageous, one further issue that it does not address is responsiveness and visibility of new files to other nodes (other filers). Even if multiple nodes can send their data to the cloud concurrently (which reduced lock sharing permits), if the metadata (which is what enables the data to be visible to other filers) is only sent when all of the data is finished, then other filers may not see the data appear for an unacceptable time period. This can be addressed by another variant, which is referred to herein as "non-preemptive sharing scheduling." According to this further optimization, a data push to the cloud is broken up into two or more separate pushes. Each push then comprise a first phase, during which the data is sent to the cloud (but not under lock, as per the reduced lock sharing concept), followed by the metadata update (which occurs under lock) to tie the new files into the shared file system. In non-preemptive sharing, preferably a time limit is associated with the first phase to limit the objects pushed during the first phase.

An issue that may arise when non-preemptive sharing scheduling is implemented is that, because not all files are pushed, it is possible to be in an inconsistent file system state. For example, take a directory that contains two files, one of which was pushed, and one which was not. Pushing one file in that directory necessitates pushing that directory for the file to be visible to other filers, but at the same time, the directory must not be pushed unless all files it contains are safely in the cloud. Because of this conflict, the directory is in an inconsistent state. While it is permissible to push a directory with a mix of modified (but pushed to the cloud) and not modified files, it is not safe to push a directory containing files that were modified but not pushed to the cloud. Thus, to maintain consistent versioned file system semantics, limiting the objects pushed in the first phase also requires matching changes in what objects are pushed in the second phase.

Without limitation, the list of data objects for pushing from a particular node in the first phase can be chosen via any means desired (large files first, oldest files first, a mix, or the like), but optimally the chosen data objects are in as few directories as possible. Because all files in a given directory need to be pushed, this constraint simplifies the second phase metadata object choice later. Preferably, the first phase works against this list until the time limit is reached, after which the sending node stops sending new files and only permits files already started to complete. This ensures that, when this phase completes, while there are a number of files in the cloud that are not yet referenced by metadata (and perhaps a number of files that were not sent at all), there are no files that are split between the two states.

The time for the first phase to push is chosen to balance responsiveness and cost. The lower the number, the more responsive the system will be (that is, new data will be available to other filers sooner). The higher the number, the lower the cost and load will be (as there is a network, storage, and processing cost for all work done when pushing data).

Before the second phase starts, preferably there is a brief clean up phase (an intermediate phase between the first phase and the second phase) during which some extra data files may be pushed to the cloud to ensure that the file system is in a consistent state, so that the second phase can push up the metadata. For example, if a given directory had two dirty files in it, and the first phase had only pushed one, that would be an inconsistent file system, so the intermediate phase will push the other file in that directory to make that directory ready for the second phase. The intermediate and second phases preferably are done together and under the same lock. The intermediate phase may be thought of as a part of second phase. When the second phase proper begins, the list of metadata objects for pushing are chosen to be the minimal set of metadata that encompasses the objects pushed in the first phase and the intermediate phase, combined with any metadata that has changed alone without a corresponding data change.

3. Merge/Push to Obtain Consistent Local View Prior to Obtaining Lock

Before a filer (a node) can begin to send data to the cloud (using the reduced lock sharing and/or non-preemptive sharing scheduling techniques described above), it is first necessary that the node have a consistent view of the volume into which the data is to be sent. In particular, each member of the sharing group must have the same view of the volume for sharing to be efficient and useful. To this end, a merge/push functionality is implemented at each node that is participating in the sharing group. That functionality is now described.

Thus, to share a fully-versioned file system between multiple nodes in a read-write fashion, asynchronous updates at each of the nodes is permitted, and each node is then allowed to "push" its individual changes to the cloud to form the next version of the file system. To present reasonably consistent semantics, before pushing its changes to create the next version, each node in the sharing group is required to merge the changes from all previous versions in the cloud that were created since the node's last push.

A push/merge cycle to generate a consistent local view of a volume (that is being shared in the cloud) is now described, by way of example. As described above, in a system of N nodes sharing read-write access to a single versioned cloud file system (i.e., a particular volume therein), changes to the file system are written locally to the cache at a node X. As also previously described, the nodes in the sharing group push their un-protected changes to the cloud, taking turns in doing so using the lock mechanism. Preferably, each push from a node X is staged from a point-in-time snapshot so that it is internally consistent. Each such push forms a new version of the versioned file system in the cloud. The changes pushed from node X are not visible at node X+1 (of the sharing group) until node X+1 sees the new version in the cloud and merges the changes from that version into its local cache. To be sure that changes from different nodes do not diverge, each node X is required to merge changes from all other nodes before pushing its changes to the cloud.

Permission to push changes to the cloud is granted by the acquisition of the lock as has been described. The lock can be implemented in a variety of ways. For an individual node, the sequence of steps in the cycle may be as follows. At step 1, the lock is obtained from the cloud (the service provider). The lock indicates what the version number of the next push should be, e.g., X. Then, at step 2, and for each version in cloud Y between a current version and version X, the changes of Y are merged into the local cache, and the current version is marked as Y+1. At step 3, a local snapshot of the cache is created, and the current version is marked X+1. The, at step 4, all local dirty changes are then pushed from the local snapshot to the cloud as version X+1. The lock is then released at step 5 to complete the push/merge cycle.

To merge the changes from a cloud version X, the local filer must have merged all versions up to and including X−1. To merge a single directory from the cloud into the corresponding cache directory the following process is used:

1. First find all elements of the cloud directory that have a shared history with an element in the cache directory. As used herein, a "shared history" means that the two objects are derived from the same original object. Each element in the cloud can only share history with a single element in the cache.

2. For each object from the cloud that shares history with a cache element, if the cloud element is "cloud-dirty" then the object should be merged in. As used herein, a cloud element is "cloud-dirty" for a version X if either its data or metadata is newly written in version X.

3. To merge an element into the cache, the routine processes cache objects depending if they are "clean" or "dirty." If a cloud object is clean, it is overwritten with the cloud object. For stub objects, overwrite simply means that the handle and metadata can be overwritten. For non-stub files, handle and metadata should be overwritten and the file data in the cache should be made into a stub. For non-stub directories, the handle and metadata should be overwritten and the contents of the cloud directory should be (recursively) merged with the cache directory. If the cache object is dirty (a name change is necessary to make metadata dirty), the conflicts may be resolved as follows. For data/data conflicts (files), the cloud object comes in labeled as a conflicting copy of the file. For data/data conflicts (directories), the cloud directory contents are (recursively) merged with cache directory. For metadata/metadata conflicts, discard the cloud metadata change and keep the local metadata change. For metadata/data conflicts, overwrite the cache metadata with the new cloud metadata but keep the cache data. For data/metadata conflicts, overwrite the handle in the cache with the cloud handle, but keep the cache metadata (for files, the cache data should be stubbed; for directories, the cloud directory should be (recursively) merged with the cache directory).

4. Next, import all elements from the cloud directory that have no shared history with the cache elements. When importing, if the cache has an object with the same name if it is clean, it can be deleted before proceeding to import. When importing, if the cache has an object with the same name if it is dirty, import the cloud object under a "conflict" name.

5. Finally, delete all elements from the cache that did not have a shared history with an element in the cloud directory (unless the element is dirty). This completes the merge process.

To merge a whole tree, the above-described merge process is carried out on the root directory of the version to be merged. This may create additional directories to be merged. Directories are continued to be merged until there are no more directories remaining to be merged.

4. Auto-Fault

To facilitate usability, it is advantageous to populate the cache of the local node with changes that are being made to the versions in the cloud. In an example scenario, multiple users add data to their shares from multiple locations. When a remote office (part of the sharing group) wants to access the data, it may be necessary to fault the data from the cloud. This can be a time-consuming process that utilizes significant resources. To ameliorate this issue, an auto-fault algorithm may be implemented at the local node to pull data proactively (as a background process). The algorithm determines when new data is added to a volume (that is the subject of the sharing group) and begins faulting it in the background proactively. Therefore, when the user at the remote office attempts to access the data preferably it is already faulted into their local cache.

Preferably, the algorithm is triggered when merging a shared file system (in particular, a volume that is being shared). As the file system volume is compared for deletions, additions, or conflicts, the newly-replicated data is scheduled for so-called "auto-fault." The file system sends the data to be auto-faulted to an auto-fault manager, which then queues the fault. Preferably, the auto-fault function runs throttled in the background, and auto-fault requests are scheduled behind user requests. Auto-fault also allows data to be pushed to the cloud so snapshots can make progress and data replication can proceed un-interrupted. If an auto-fault is scheduled and the data is requested by the user, the auto-fault request is re-scheduled and the user request is serviced without delay. All prefetch associated with the auto-fault request will also be treated as a user request.

Preferably, auto-fault is called as part of the merge process, and it helps to provide better responsiveness of shared data, especially in the case of thinly-provisioned distributed system.

The above-described techniques provide significant advantages, the foremost being the ability to share independent volumes that are established by distinct filers. This conserves storage space in the cloud, does not require the use of shadow volumes, does not require snapshots to alternate between or among filers, facilitates near-live sharing of files even before a snapshot is complete, maintains synchronous snapshot of file system capability, and enables multiple volumes to have independent histories without twice the data being persisted in the cloud.

The filers may be anywhere geographically, and no network connectivity between or among the filers is required (provided filers have a connection to the service).

Sharing enables multi-site access to a single shared volume. The data in the volume is 100% available, accessible, secure and immutable. The approach has infinite scalability and eliminates local capacity constraints. The sites (nodes) may comprise a single enterprise environment (such as geographically-distributed offices of a single enterprise division or department), but this is not a requirement, as filers are not required to comprise an integrated enterprise. This enables partners to share the file system (and thus particular volumes therein) in the cloud. Using the service provider-supplied interfaces, which are preferably web-based, the permitted users may set up a sharing group and manage it. Using the sharing approach as described, each member of the sharing group in effect "sees" the same volume. Thus, any point-in-time recovery of the shared volume is provided, and full read/write access is enabled from each node in the sharing group.

One of ordinary skill in the art will appreciate that the interface described herein provides a primary, local, but preferably non-resident application layer to interface the local file system to the data store. As has been described, the interface caches user data and file system metadata (organized in a unique manner) to the data store (e.g., one or more SSPs), preferably as a service. The metadata provides a level of indirection (from the data), and the VFS enables it to be stored separately from the data that it represents.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the interface functions is tangible.

A given implementation of the disclosed subject matter is software written in a given programming language that runs on a server on an Intel-based hardware platform running an operating system such as Linux. As noted above, the interface may be implemented as well as a virtual machine or appliance, or in any other tangible manner.

While given components of the system have been described separately, one of ordinary skill will appreciate that some of the functions may be combined or shared in given instructions, program sequences, code portions, and the like.

Having described our invention, what we now claim is as follows:

1. A method of data sharing among multiple filer entities, at least one of which creates and exports to a cloud data store one or more structured data representations comprising a versioned file system, wherein filer entities do not interact with one another, comprising:
    receiving information from which a sharing group that includes two or more of the multiple filer entities is configured; and
    enabling sharing, as a volume, of the one or more structured data representations created and exported by the at least one filer entity by at least one other of the filer entities; and
    after sharing is enabled with respect to the one or more structured data representations, managing distribution, using software executing in a hardware machine, of a single, shared version identifier among the at least one filer entity and the at least other of the filer entities such that one and only one of the filer entities sharing the volume are enabled to create a new version of the versioned file system having that version identifier.

2. The method as described in claim 1 wherein the sharing is enabled by a first entity performing a snapshot with respect to its versioned file system and, as the snapshot is being performed, restricting other of the entities in the sharing group from performing a snapshot with respect to their versioned file systems.

3. The method as described in claim 2 further including notifying each other entity in the sharing group of a changed file generated as a result of the snapshot being performed by the first entity.

4. The method as described in claim 3 further including having an entity that receives a notification of the changed file update its versioned file system.

5. The method as described in claim 1 wherein the structured data representation is an XML representation.

6. The method as described in claim 2 wherein the restricting step is implemented using a lock.

7. The method as described in claim 6 wherein the lock is activated before data is sent to the data store.

8. The method as described in claim 6 wherein the lock is activated after data is sent to the data store but before updating metadata associated with the data.

9. The method as described in claim 6 further including restricting a size of the snapshot.

10. The method as described in claim 6 further including restricting a time period associated with the snapshot.

11. The method as described in claim 6 further including restricting a type of object associated with the snapshot.

12. The method as described in claim 2 further including obtaining a local coherent view of the structured data representations across the data store prior to performing the snapshot.

13. The method as described in claim 12 further including faulting given data to facilitate sharing of the structured data representations.

14. Apparatus associated with multiple filer entities, at least one of which creates and exports to a cloud data store one or more structured data representations comprising a versioned file system, wherein filer entities do not interact with one another, comprising:

a processor; and computer memory storing computer program instructions executed by the processor (a) to generate a web-based interface by which a sharing group that includes two or more of the multiple filer entities is configured, (b) to enable sharing, as a volume, of the one or more structured data representations created and exported by the at least one filer entity by at least one other of the filer entities; and (c) after sharing is enabled with respect to the one or more structured data representations, to manage distribution of a single, shared version identifier among the at least one filer entity and the at least other of the filer entities such that one and only one of the filer entities sharing the volume are enabled to create a new version of the versioned file system having that version identifier.

* * * * *